US012767794B2

(12) United States Patent
Aruga

(10) Patent No.: US 12,767,794 B2
(45) Date of Patent: Oct. 20, 2026

(54) RESIN COMPOSITION AND LAYERED BODY

(71) Applicant: AGC INC., Tokyo (JP)

(72) Inventor: Hiroshi Aruga, Chiyoda-ku (JP)

(73) Assignee: AGC INC., Tokyo (JP)

( * ) Notice: Subject to any disclaimer, the term of this patent is extended or adjusted under 35 U.S.C. 154(b) by 707 days.

(21) Appl. No.: 18/295,935

(22) Filed: Apr. 5, 2023

(65) Prior Publication Data

US 2023/0235152 A1 Jul. 27, 2023

Related U.S. Application Data

(63) Continuation of application No. PCT/JP2021/029847, filed on Aug. 13, 2021.

(30) Foreign Application Priority Data

Oct. 7, 2020 (JP) ................................ 2020-170122

(51) Int. Cl.

*C08L 1/14* (2006.01)
*B32B 33/00* (2006.01)
*C08L 27/18* (2006.01)
*C08L 29/02* (2006.01)

(52) U.S. Cl.

CPC ................ *C08L 1/14* (2013.01); *B32B 33/00* (2013.01); *C08L 27/18* (2013.01); *C08L 29/02* (2013.01); *B32B 2255/10* (2013.01); *B32B 2255/26* (2013.01); *B32B 2307/416* (2013.01); *B32B 2317/18* (2013.01); *B32B 2327/18* (2013.01); *B32B 2329/04* (2013.01); *B32B 2419/06* (2013.01)

(58) Field of Classification Search

CPC . C08L 1/14; C08L 27/18; C08L 29/02; B32B 33/00; B32B 2255/10; B32B 2255/26; B32B 2307/416; B32B 2317/18; B32B 2327/18; B32B 2329/04; B32B 2419/06

USPC ........................................................... 524/39

See application file for complete search history.

(56) References Cited

U.S. PATENT DOCUMENTS

| | | | | |
|---|---|---|---|---|
| 2012/0107604 | A1 | 5/2012 | Aruga | |
| 2016/0289483 | A1* | 10/2016 | Yamamoto ........... | C09D 129/04 |

FOREIGN PATENT DOCUMENTS

| | | | |
|---|---|---|---|
| JP | 2006-152061 | A | 6/2006 |
| JP | WO 2011/013572 | A1 | 2/2011 |
| JP | WO 2015/137284 | A1 | 9/2015 |

OTHER PUBLICATIONS

Product Data Sheet for Eastman Cellulose Acetate Butyrate (CAB-381-0.1) (Year: 2017).*

International Search Report issued Oct. 19, 2021 in PCT/JP2021/029847 filed on Aug. 13, 2021, 2 pages.

* cited by examiner

*Primary Examiner* — Kelechi C Egwim

(74) *Attorney, Agent, or Firm* — Oblon, McClelland, Maier & Neustadt, L.L.P.

(57) ABSTRACT

A resin composition includes: a copolymer including a fluoroolefin unit and a monomer unit having a hydroxy group; and an esterified cellulose resin; in which the amount of the esterified cellulose resin is from 0.2 to 9 parts by mass with respect to 100 parts by mass of the copolymer including a fluoroolefin unit and a monomer unit having a hydroxy group. A layered body includes a coating film formed from the resin composition.

12 Claims, 2 Drawing Sheets

RESIN COMPOSITION AND LAYERED BODY

CROSS-REFERENCE TO RELATED APPLICATIONS

This application is a continuation of International Application No. PCT/JP2021/029847, filed on Aug. 13, 2021, which claims priority from Japanese Patent Application No. 2020-170122, filed on Oct. 7, 2020. The entire disclosure of each of the above applications is incorporated herein by reference.

TECHNICAL FIELD

The present disclosure relates to a resin composition and a layered body.

BACKGROUND ART

Fluororesin films have excellent weather resistance, contamination resistance and the like, and thus are used as membrane materials (e.g., roofing materials and exterior wall materials) for use in membrane structure facilities (e.g., sports facilities (e.g., swimming pools, gymnasia, tennis courts, soccer fields and athletic stadiums), warehouses, assembly halls, exhibition halls, and horticultural facilities (e.g., horticultural greenhouses and agricultural greenhouses)). However, since fluororesin films have high solar transmittance, in a case in which a fluororesin film is used as a membrane material for a membrane structure facility that is exposed to solar radiation, the interior of the membrane structure facility may be too bright, or air temperature in the interior of the membrane structure facility may be too high. For this reason, fluororesin films are occasionally printed with coating materials so as to increase solar reflectance. Further, films are occasionally printed with team colors, logos and the like of the teams that use a sports facility, using coating materials.

As the coating materials applied to fluororesin films, coating materials containing a fluororesin that have excellent weather resistance as with fluororesin films are preferably used. For example, Patent Document 1 proposes a non-curable composition for forming a coating film to be coated on a fluororesin substrate, the composition containing a fluororesin that has a mass average molecular weight within a specific range and that contains a specific functional group in a specific proportion, and a solvent.

Patent Document 2 proposes a fluororesin-containing coating material that contains a white pigment having a specific composition or a known green pigment, and a fluororesin film using the same.

RELATED ART DOCUMENT

Patent Documents

Patent Document 1: Japanese Patent Application Laid-Open (JP-A) No. 2006-152061

Patent Document 2: WO 2011/013572

SUMMARY OF THE INVENTION

Technical Problem

In many cases, coating films formed from coating materials are disposed such that the printed surfaces face each other, in order to protect the surfaces, for example, from wearing that occurs due to contacting with rain, pebbles, sand and the like, and from friction with fixing materials for the films and the like. Further, on some occasions, two-layered films are prepared with printed surfaces facing each other, which are carried to the site of use, extended, and inflated with air. When the coating films come into contact with each other, occurrence of blocking may be a problem.

On the other hand, films for membrane structures are used as membrane materials for roofs, walls or the like by itself, and thus constantly experience repeated deformation and recovery, for example, deformation of the film owing to snow load, vibration by wind, and stamping by rain drops. Coating materials to be printed on such films are required to have a high adhesion so that the coating films do not peel off even when the films are deformed.

However, the methods disclosed in Patent Documents 1 and 2 have room for improvement in terms of achieving both adhesion and blocking resistance.

The present disclosure relates to providing a resin composition having an excellent adhesion and blocking resistance, and a layered body including a coating film formed from the resin composition.

Solution to Problem

Means for solving the foregoing problems include the following embodiments.

(1) A resin composition, containing:

a copolymer including a fluoroolefin unit and a monomer unit having a hydroxy group; and an esterified cellulose resin, wherein a content of the esterified cellulose resin is from 0.2 to 9 parts by mass with respect to 100 parts by mass of the copolymer including a fluoroolefin unit and a monomer unit having a hydroxy group.

(2) The resin composition according to (1), wherein the esterified cellulose resin has a hydroxy group content of from 0.1 to 10% by mass.

(3) The resin composition according to (1) or (2), wherein the esterified cellulose resin includes at least one selected from the group consisting of a cellulose acetate butyrate resin and a cellulose acetate propionate resin.

(4) The resin composition according to any one of (1) to (3), wherein the fluoroolefin includes at least one selected from the group consisting of vinyl fluoride, vinylidene fluoride, trifluoroethylene, chlorotrifluoroethylene, tetrafluoroethylene, hexafluoropropylene, perfluorobutene-1, perfluorohexene-1, perfluorononene-1, and a (perfluoroalkyl)ethylene.

(5) The resin composition according to any one of (1) to (4), wherein the monomer having a hydroxy group includes at least one selected from the group consisting of allyl alcohol, a hydroxyalkyl vinyl ether, a hydroxyalkyl allyl ether, a hydroxyalkyl (meth)acrylate, a vinyl hydroxyalkylcarboxylate, and an allyl hydroxyalkylcarboxylate.

(6) The resin composition according to any one of (1) to (5), wherein:

the resin composition does not contain a curing agent, or the resin composition contains a curing agent, and a molar ratio of curable groups in the curing agent to hydroxy groups in the copolymer including a fluoroolefin unit and a monomer unit having a hydroxy group, is 0.5 or less.

(7) The resin composition according to any one of (1) to (6), wherein the resin composition is a coating material for being applied to a substrate containing a fluororesin.

(8) A layered body, including:

a substrate; and a coating film formed from the resin composition according to any one of (1) to (6).

(9) The layered body according to (8), wherein the substrate contains a fluororesin.

(10) The layered body according to (9), wherein the fluororesin includes at least one selected from the group consisting of a vinyl fluoride polymer, a vinylidene fluoride polymer, a vinylidene fluoride-hexafluoropropylene copolymer, a tetrafluoroethylene-hexafluoropropylene-vinylidene fluoride copolymer, a tetrafluoroethylene-propylene copolymer, a tetrafluoroethylene-vinylidene fluoride-propylene copolymer, an ethylene-tetrafluoroethylene copolymer, a hexafluoropropylene-tetrafluoroethylene copolymer, an ethylene-hexafluoropropylene-tetrafluoroethylene copolymer, a perfluoro(alkyl vinyl ether)-tetrafluoroethylene copolymer, a chlorotrifluoroethylene polymer, and an ethylene-chlorotrifluoroethylene copolymer.

(11) The layered body according to any one of (8) to (10), wherein the layered body is a membrane material for a membrane structure facility, a screen, a signboard, or solar radiation control.

Advantageous Effects of Invention

The present disclosure provides a resin composition having an excellent adhesion and blocking resistance, and a layered body including a coating film formed from the resin composition.

DESCRIPTION OF EMBODIMENTS

Figure 1:
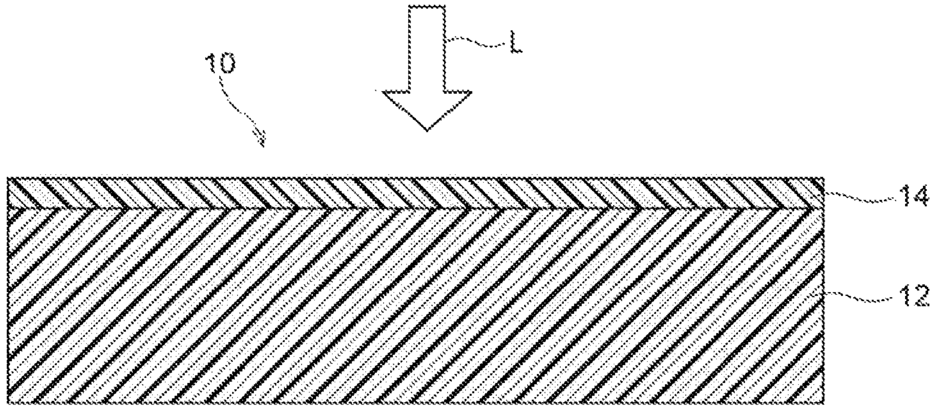
FIG. 1 is a cross-sectional view showing an example of a layered body in one embodiment of the present disclosure.

Embodiments according to the present disclosure will be described in detail below. However, the embodiments according to the present disclosure are not limited to the following embodiments.

In the present disclosure, the term "step" includes not only a step independent from another step but also a step that is not clearly distinguishable from another step as long as an object of the step is achieved.

In the present disclosure, a numerical range specified using "(from) . . . to . . . " represents a range including the numerical values noted before and after "to" as a minimum value and a maximum value, respectively.

In the present disclosure, each component may include plural substances corresponding to the component. In a case in which plural substances corresponding to a component are present in a composition, the amount or content of the component in the composition means the total amount or content of the plural substances present in the composition unless otherwise specified.

In the present disclosure, in a case in which an embodiment is described with reference to drawings, the configuration of the embodiment is not limited to the configuration shown in the drawings. The size of each member in each drawing is conceptual, and relative relationships between respective members are not limited thereto. Further, in the respective drawings, members having functions that are substantially the same with one another may be denoted with the same reference numerals throughout all the drawings, and redundant descriptions may be omitted.

In the present disclosure, the term "unit" refers to a portion that is present in a polymer as a component of the polymer and that is derived from a monomer. Further, a structure of a certain unit that has been chemically converted after the formation of a polymer is also referred to as a unit. In some cases, a unit derived from an individual monomer is called by a name in which the term "unit" is added to the name of the monomer.

In the present disclosure, a film or a sheet is referred to as a "film", regardless of the thickness thereof.

In the present disclosure, acrylate and methacrylate are collectively referred to as "(meth)acrylate".

<<Resin Composition>>

A resin composition according to the present disclosure includes: a copolymer (hereinafter, also referred to as "specific fluororesin") including a fluoroolefin unit and a monomer unit having a hydroxy group; and an esterified cellulose resin; wherein the amount of the esterified cellulose resin is from 0.2 to 9 parts by mass with respect to 100 parts by mass of the copolymer including a fluoroolefin unit and a monomer unit having a hydroxy group. In the resin composition according to the present disclosure, both excellent adhesion to a substrate and excellent blocking resistance are achieved.

In general, esterified cellulose resins adhere to PET films, polystyrene films or the like which have been surface-treated by corona discharge, plasma discharge or the like, but are difficult to adhere to fluororesin films even when the films are surface-treated by the same method. Further, fluororesins and esterified cellulose resins are not necessarily miscible at an arbitrary ratio, and are difficult to be entangled with each other. Therefore, it is generally considered to be difficult to use esterified cellulose resins in fluororesin-containing resin compositions for being applied to fluororesin films. However, only by incorporating a small amount of an esterified cellulose resin to the specific fluororesin, the blocking resistance can be markedly improved and adhesion to a fluororesin film can be maintained. In particular, an improvement in blocking temperature is observed by incorporating an esterified cellulose resin in an amount of as small as 0.2 parts by mass to 100 parts by mass of the specific fluororesin. It is believed that one of the reasons for this is that, during drying of the resin composition applied, the esterified cellulose resin, which has a high glass transition temperature, is unevenly located at the surface layer of the resin composition that is in contact with external air.

The respective components of the resin composition will be described below in detail.

<Specific Fluororesin>

The resin composition includes a copolymer (i.e., the specific fluororesin) including a fluoroolefin unit and a monomer unit having a hydroxy group. Since the specific fluororesin includes a monomer unit having a hydroxy group in addition to a fluoroolefin unit, the specific fluororesin has favorable adhesion to a substrate, in addition to the properties of a fluororesin, such as excellent weather resistance and contamination resistance. The specific fluororesin may or may not include another monomer unit in addition to the fluoroolefin unit and the monomer unit having a hydroxy group. One kind of the specific fluororesin may be used singly, or two or more kinds thereof may be used in combination.

The fluoroolefin is preferably a fluoroolefin having 10 or less carbon atoms. Specific examples thereof include vinyl fluoride, vinylidene fluoride, trifluoroethylene, chlorotrifluoroethylene (hereinafter, also referred to as "CTFE"), tetrafluoroethylene (hereinafter, also referred to as "TFE"), hexafluoropropylene, perfluorobutene-1, perfluorohexene-1, perfluorononene-1, and a (perfluoroalkyl)ethylene.

The "(perfluoroalkyl)ethylene" is a fluoroolefin represented by the formula CH2=CH—Rf (wherein Rf represents a perfluoroalkyl group). Specific examples thereof include (perfluoromethyl)ethylene and (perfluorobutyl)ethylene.

The (perfluoroalkyl)ethylene is preferably a (perfluoroalkyl)ethylene having from 3 to 8 carbon atoms. The perfluoroalkyl may be a linear or branched perfluoroalkyl.

Preferable examples of a fluoroolefin other than the (perfluoroalkyl)ethylene include a fluoroolefin having 2 or 3 carbon atoms.

The monomer having a hydroxy group, in connection with the monomer unit having a hydroxy group, may be a monomer having a fluorine atom or a monomer not having a fluorine atom, and is preferably a monomer not having a fluorine atom. Examples of the monomer having a hydroxy group include allyl alcohol, a hydroxyalkyl vinyl ether, a hydroxyalkyl allyl ether, a hydroxyalkyl (meth)acrylate, a vinyl hydroxyalkylcarboxylate, and an allyl hydroxyalkylcarboxylate. In a monomer having a hydroxyalkyl group, the alkyl group of the hydroxyalkyl group may be any of linear, branched and cyclic alkyl groups, or may be any combination thereof. In a case in which the alkyl group is a combination of two or more of these alkyl groups, the hydroxy group may be located at any position. The hydroxyalkyl group of the monomer having a hydroxyalkyl group may be a hydroxycycloalkyl group, a hydroxyalkyl-substituted cycloalkyl group or the like. The hydroxyalkyl group preferably has 10 or less carbon atoms, and more preferably 6 or less carbon atoms.

Examples of the hydroxyalkyl vinyl ether include 2-hydroxyethyl vinyl ether, 3-hydroxypropyl vinyl ether, 4-hydroxybutyl vinyl ether, and 4-hydroxycyclohexyl vinyl ether.

Examples of the hydroxyalkyl allyl ether include 2-hydroxyethyl allyl ether, 3-hydroxypropyl allyl ether, 4-hydroxybutyl allyl ether, and 4-hydroxycyclohexyl allyl ether.

Examples of the hydroxyalkyl (meth)acrylate include 2-hydroxyethyl (meth)acrylate.

Examples of the vinyl hydroxyalkylcarboxylate include vinyl hydroxyacetate, vinyl hydroxyisobutyrate, vinyl hydroxypropionate, vinyl hydroxybutyrate, vinyl hydroxyvalerate and vinyl hydroxycyclohexanecarboxylate.

Examples of the allyl hydroxyalkylcarboxylate include allyl hydroxyacetate, allyl hydroxypropionate, allyl hydroxybutyrate, allyl hydroxyisobutyrate, and allyl hydroxycyclohexanecarboxylate.

The monomer unit other than the fluoroolefin unit and the monomer unit having a hydroxy group may be, for example, a unit derived from a fluorine-containing monomer other than the fluoroolefin, or a unit derived from a monomer that does not have a fluorine atom.

The fluorine-containing monomer other than the fluoroolefin may be, for example, a perfluoro(alkyl vinyl ether) or a perfluoro unsaturated cyclic ether.

The perfluoro(alkyl vinyl ether) is preferably a perfluoro (alkyl vinyl ether) having 10 or less carbon atoms, and more preferably one having 6 or less carbon atoms. Specific examples thereof include perfluoro(methyl vinyl ether), perfluoro(ethyl vinyl ether), perfluoro(propyl vinyl ether), and perfluoro(heptyl vinyl ether).

The monomer not having a fluorine atom may be, for example, an olefin, a vinyl ether, an allyl ether, a vinyl carboxylate, an allyl carboxylate, or an unsaturated carboxylic acid ester. The above-described monomers, except for the olefin, preferably have 16 or less carbon atoms, and more preferably 12 or less carbon atoms.

The olefin is preferably an olefin having from 2 to 4 carbon atoms, and examples thereof include ethylene, propylene, and isobutylene.

Examples of the vinyl ether include a cycloalkyl vinyl ether (e.g., cyclohexyl vinyl ether), and an alkyl vinyl ether (e.g., nonyl vinyl ether, 2-ethylhexyl vinyl ether, hexyl vinyl ether, ethyl vinyl ether, n-butyl vinyl ether, or tert-butyl vinyl ether).

Examples of the allyl ether include an alkyl allyl ether (e.g., ethyl allyl ether or hexyl allyl ether).

Examples of the vinyl carboxylate include a vinyl ester of a carboxylic acid (e.g., acetic acid, butyric acid, pivalic acid, benzoic acid, or propionic acid). Further, VEOVA 9 (registered trademark), VEOVA 10 (registered trademark) or the like, manufactured by Shell Chemicals Limited, may be used as a vinyl ester of a carboxylic acid having a branched alkyl group.

Examples of the allyl carboxylate include an allyl ester of a carboxylic acid (e.g., acetic acid, butyric acid, pivalic acid, benzoic acid, or propionic acid).

Examples of the unsaturated carboxylic acid ester include methyl (meth)acrylate, ethyl (meth)acrylate, n-propyl (meth)acrylate, isopropyl (meth)acrylate, n-butyl (meth) acrylate, isobutyl (meth)acrylate, tert-butyl (meth)acrylate, n-amyl (meth)acrylate, isoamyl (meth)acrylate, n-hexyl (meth)acrylate, isohexyl (meth)acrylate, 2-ethylhexyl (meth)acrylate and lauryl (meth)acrylate.

The specific fluororesin may further include a monomer unit having a cross-linkable group other than the hydroxy group, such as a carboxy group, an amide group, or an epoxy group.

The combination of the fluoroolefin unit and the monomer unit having a hydroxy group in the specific fluororesin is particularly preferably a combination of at least one selected from the group consisting of tetrafluoroethylene and chlorotrifluoroethylene, and a hydroxyalkyl vinyl ether.

The proportion of the fluoroolefin unit in the specific fluororesin is preferably from 30 to 70% by mole, and more preferably from 40 to 60% by mole, of total units in the specific fluororesin. When the proportion of the fluoroolefin unit is equal to or higher than the lower limit values of the ranges described above, a coating film having excellent weather resistance, contamination resistance and the like tends to be obtained. When the proportion of the fluoroolefin unit is equal to or lower than the upper limit values of the ranges described above, the resulting coating film tends to have an even superior adhesion to a substrate.

The proportion of the monomer unit having a hydroxy group in the specific fluororesin is preferably from 0.5 to 20% by mole, and more preferably from 1 to 15% by mole, of the total units in the specific fluororesin. When the proportion of the monomer unit having a hydroxy group is equal to or higher than the lower limit values of the ranges described above, the resulting coating film tends to have an even superior adhesion to a substrate. When the proportion of the monomer unit having a hydroxy group is equal to or lower than the upper limit values of the ranges described above, the coating film tends to have an excellent flexibility.

The proportion of each monomer unit in the fluororesin can be confirmed by a nuclear magnetic resonance apparatus (NMR).

In one embodiment, the specific fluororesin is preferably a copolymer including a fluoroolefin unit, a monomer unit having a hydroxy group, and a non-fluorine-based monomer unit that does not have a hydroxy group. Such a copolymer is hereinafter also referred to as “copolymer (A)”.

The combination of monomers constituting the copolymer (A) is preferably the following combination (1), and more preferably the following combination (2) or (3), from the viewpoints that the solar reflectance of the resulting coating film is less likely to decrease over a long period of time in a case in which the resin composition is used for forming a solar reflective layer, that the coating film has an excellent adhesion to a substrate, and that the coating film has excellent flexibility.

Combination (1)

Fluoroolefin: tetrafluoroethylene or chlorotrifluoroethylene

Monomer having a hydroxy group: a hydroxyalkyl vinyl ether

Non-fluorine-based monomer that does not have a hydroxy group: at least one selected from the group consisting of a cycloalkyl vinyl ether, an alkyl vinyl ether, and a carboxylic acid vinyl ester Combination (2)

Fluoroolefin: tetrafluoroethylene

Monomer having a hydroxy group: a hydroxyalkyl vinyl ether

Non-fluorine-based monomer that does not have a hydroxy group: at least one selected from the group consisting of tert-butyl vinyl ether and a carboxylic acid vinyl ester Combination (3)

Fluoroolefin: chlorotrifluoroethylene

Monomer having a hydroxy group: a hydroxyalkyl vinyl ether

Non-fluorine-based monomer that does not have a hydroxy group: at least one selected from the group consisting of tert-butyl vinyl ether and a carboxylic acid vinyl ester The proportion of the fluoroolefin unit in the copolymer (A) is preferably from 30 to 70% by mole, and more preferably from 40 to 60% by mole, of the total units (100% by mole) of the copolymer (A). When the proportion of the fluoroolefin unit is equal to or higher than the lower limit values of the ranges described above, a coating film having excellent weather resistance, contamination resistance and the like tends to be obtained. When the proportion of the fluoroolefin unit is equal to or lower than the upper limit values of the ranges described above, the resulting coating film tends to have even superior adhesion to a substrate.

The proportion of the monomer unit having a hydroxy group in the copolymer (A) is preferably from 0.5 to 20% by mole, and more preferably from 1 to 15% by mole, of the total units in the copolymer (A). When the proportion of the monomer unit having a hydroxy group is equal to or higher than the lower limit values of the ranges described above, the resulting coating film tends to have even superior adhesion to a substrate. When the proportion of the monomer unit having a hydroxy group is equal to or lower than the upper limit values of the ranges described above, the coating film tends to have excellent flexibility.

The proportion of the non-fluorine-based monomer unit that does not have a hydroxy group in the copolymer (A) is preferably from 20 to 60% by mole, and more preferably from 30 to 50% by mole, of the total units of the copolymer (A). When the proportion of said monomer unit is equal to or higher than the lower limit values of the ranges described above, the resulting coating film tends to have excellent flexibility. When the proportion of this monomer unit is equal to or lower than the upper limit values of the ranges described above, the coating film tends to have even superior adhesion to a substrate.

Examples of commercially available products of the copolymer (A) include: LUMIFLON (registered trademark) series (e.g., LF200, LF100, LF710, and LF600) (manufactured by AGC Inc.); ZEFFLE (registered trademark) GK series (e.g., GK-500, GK-510, GK-550, GK-570, and GK-580) (manufactured by Daikin Industries, Ltd.); FLUONATE (registered trademark) series (e.g., K-700, K-702, K-703, K-704, K-705, and K-707) (manufactured by DIC Corporation); and ETERFLON series (e.g., 4101, 41011, 4102, 41021, 4261A, 4262A, 42631, 4102A, 41041, 41111, and 4261A) (manufactured by Eternal Chemical Co., Ltd.).

From the viewpoint of obtaining favorable adhesion, the specific fluororesin preferably has a hydroxy value of from 10 to 150 mg KOH/g, more preferably from 15 to 120 mg KOH/g, still more preferably from 20 to 100 mg KOH/g, and particularly preferably from 20 to 50 mg KOH/g. The hydroxy value of the fluororesin is a value measured in accordance with the method A defined in ISO 14900:2001.

The content of the specific fluororesin in the resin composition may be 30% by mass or more, 40% by mass or more, or 50% by mass or more with respect to the total mass of the resin composition. Further, the content of the specific fluororesin in the resin composition may be 90% by mass or less, or 80% by mass or less with respect to the total mass of the resin composition. From these points of view, the content of the specific fluororesin in the resin composition may be from 30 to 90% by mass, from 40 to 80% by mass, or from 50 to 80% by mass, with respect to the total mass of the resin composition.

<Esterified Cellulose Resin>

The resin composition according to the present disclosure includes an esterified cellulose resin, and the amount of the esterified cellulose resin is from 0.2 to 9 parts by mass with respect to 100 parts by mass of the specific fluororesin. When the amount of the esterified cellulose resin with respect to the specific fluororesin is within the range described above, both adhesion and blocking resistance can be achieved in a favorable manner. Since an esterified cellulose resins are not generally highly miscible with fluororesins, as described above, mixing esterified cellulose resins with fluororesins tends to result in decreased cohesion. In the resin composition according to the present disclosure, however, a decrease in the cohesion of the coating film can be suppressed when the content of the esterified cellulose resin is within the range described above.

The amount of the esterified cellulose resin is from 0.2 to 9 parts by mass, preferably from 0.5 to 7 parts by mass, and more preferably from 1 to 5 parts by mass, with respect to 100 parts by mass of the specific fluororesin. When the amount of the esterified cellulose resin is equal to or higher than the lower limit values of the ranges described above, favorable blocking resistance can be obtained. When the amount is equal to or lower than the upper limit values of the ranges described above, the resin composition after a weather resistance test, in particular, has excellent adhesion to a fluororesin substrate.

From the same points of view, the amount of the esterified cellulose resin is preferably from 0.20 to 9.00 parts by mass, more preferably from 0.50 to 7.00 parts by mass, and still more preferably from 1.00 to 5.00 parts by mass, with respect to 100 parts by mass of the specific fluororesin.

The masses of the specific fluororesin and the esterified cellulose resin in the resin composition are quantified using the difference in solubility therebetween. For example, the masses of the respective components can be determined and the mass ratio thereof can be calculated by dissolving the specific fluororesin in a solvent (e.g., toluene) in which the esterified cellulose resin is not dissolved and in which the specific fluororesin is dissolved. Further, the presence of the esterified cellulose resin in the resin composition and the amount thereof can be confirmed by an infrared spectroscopy measurement.

From the viewpoint of the blocking resistance, the amount of the esterified cellulose resin is preferably 1 part by mass or more, and may be 2 parts by mass or more, or 3 parts by mass or more, with respect to 100 parts by mass of the specific fluororesin. It has been found that an increase in the amount of the esterified cellulose resin tends to result in an increase in the blocking temperature until the content of the esterified cellulose resin reaches about 5 parts by mass with respect to 100 parts by mass of the specific fluororesin. However, when the amount of the esterified cellulose resin is increased to higher than 5 parts by mass, the blocking temperature is only maintained and is not further increased. Therefore, from the viewpoint of obtaining excellent adhesion to a substrate, excellent cohesion of the coating film and the like, the amount of the esterified cellulose resin with respect to 100 parts by mass the specific fluororesin may be 8 parts by mass or less, 7 parts by mass or less, 6 parts by mass or less, or 5 parts by mass or less.

From the same points of view, the amount of the esterified cellulose resin is preferably 1.00 parts by mass or more, may be 2.00 parts by mass or more, or may be 3.00 parts by mass or more, with respect to 100 parts by mass of the specific fluororesin. Further, the amount of the esterified cellulose resin may be 8.00 parts by mass or less, 7.00 parts by mass or less, 6.00 parts by mass or less, or 5.00 parts by mass or less, with respect to 100 parts by mass of the specific fluororesin.

The esterified cellulose resin may be, for example, a cellulose acetate resin, a cellulose acetate butyrate (CAB) resin, or a cellulose acetate propionate (CAP) resin. In general, a CAP is obtained by triesterification of cellulose with acetic acid and propionic acid, followed by hydrolysis. CAB is obtained by triesterification of cellulose with acetic acid and butyric acid, followed by hydrolysis.

The esterified cellulose resin is preferably at least one selected from the group consisting of CAB or CAP. One kind of the esterified cellulose resin may be used singly, or two or more kinds thereof may be used in combination.

The properties of the esterified cellulose resin can be represented by the molecular weight, glass transition temperature, hydroxy group content, acetyl group content, butyryl group content, propionyl group content and the like.

The esterified cellulose resin preferably has a hydroxy group content of from 0.1 to 10% by mass, and more preferably from 0.2 to 5% by mass. It is presumed that, when the esterified cellulose resin has a hydroxy group content within the ranges described above, the esterified cellulose resin is relatively miscible with the fluororesin, whereby the cohesion of the resulting coating film tends to be suitably maintained. When the hydroxy group content of the esterified cellulose resin is equal to or lower than the upper limit values of the ranges described above, the coating film formed from the resin composition has a reduced water absorption rate and favorable weather resistance. In particular, this is useful in that favorable weather resistance can be obtained even in a case in which the resin composition does not contain a curing agent, or contains a curing agent in a limited content. Further, a reduced water content of the coating film leads to reduced photolysis of the fluororesin, whereby deterioration in the adhesion of the coating film can be suppressed. While in general, the decrease in the adhesion owing to photolysis is more likely to occur in a case in which a pigment such as an aluminum-based pigment or a titanium oxide is used, this is useful, in particular, in that the deterioration in the adhesion can be suppressed even in the case of using such a pigment.

In a case in which the esterified cellulose resin is CAB, the acetyl group content in the CAB is preferably from 1 to 30% by mass, and more preferably from 2 to 20% by mass. Further, the butyryl group content in the CAB is preferably from 10 to 60% by mass, and more preferably from 20 to 55% by mass. A higher butyryl group content results in a better solubility in an organic solvent.

In a case in which the esterified cellulose resin is CAP, the acetyl group content in the CAP is preferably from 0.1 to 20% by mass, and more preferably from 0.5 to 10% by mass. Further, the propionyl group content in the CAP is preferably from 30 to 60% by mass, and more preferably from 40 to 50% by mass. A higher propionyl group content results in a better solubility in an organic solvent.

The hydroxy group content, the acetyl group content, the butyryl group content, and the propionyl group content of the esterified cellulose resin are values obtained in accordance with ASTM D817-12 (2019): Standard Test Methods of Testing Cellulose Acetate Propionate and Cellulose Acetate Butyrate.

The esterified cellulose resin preferably has a number average molecular weight of from 12,000 to 75,000, and more preferably from 20,000 to 50,000. When the number average molecular weight of the esterified cellulose resin is equal to or higher than the lower limit values of the ranges described above, the effect of adding the cellulose is exhibited more favorably. When the number average molecular weight is equal to or lower than the upper limit values of the ranges described above, a resin composition having a viscosity excellent in gravure printability can be obtained. The number average molecular weight of the esterified cellulose resin is measured by gel permeation chromatography (GPC). Specifically, the number average molecular weight is measured using tetrahydrofuran, and using a gel permeation chromatograph (GPC apparatus: HLC-8320 GPC, column: TSKgel $\alpha$-M, manufactured by Tosoh Corporation), in terms of polystyrene.

From the viewpoint of further improving the blocking resistance, the esterified cellulose resin preferably has a glass transition temperature of 80 °C or higher, more preferably 100 °C or higher, and still more preferably 120 °C or higher. The upper limit of the glass transition temperature is not particularly limited, and for example, the glass transition temperature may be 200 °C or lower.

The glass transition temperature of the esterified cellulose resin is a value measured by a dynamic viscoelasticity measurement (DMA) method.

Examples of commercially available products of the esterified cellulose resin include: CAP-482-20, CAP-482-0.5, CAP-504-0.2, CAB-551-0.01, CAB-551-0.2, CAB-553-0.4, CAB-531-1, CAB-500-5, CAB-381-0.1, CAB-381-0.5, CAB-381-2, CAB-381-20, CAB-381-20 BP, CAB-321-0.1, and CAB-171-15 (all of the above are trade names) manufactured by Eastman Chemical Japan Ltd. Among these, CAB-381-2 and CAB-551-0.01 are preferable.

<Curing Agent>

The resin composition according to the present disclosure may or may not contain a curing agent. When the resin composition contains a curing agent, the resin composition tends to show improvements in water resistance, solvent resistance, and blocking resistance. In particular, the incorporation of a curing agent tends to result in a further increase in the blocking temperature. On the other hand, from the viewpoint of adhesion to a fluororesin substrate, it is preferable that the resin composition does not contain a curing agent, or contains a curing agent only in a small amount. In a case in which substrates are bonded with one another by thermocompression bonding or the like in using the composition to, for example, membrane structures, coating films applied to the substrates may need to be removed. While the coating films can be physically removed using a sand blaster, a grinder or the like, in a case of wiping off the coating film using a solvent, coating films that have undergone a chemical curing reaction by using a curing agent may not be easily wiped off. Therefore, from the viewpoint of facilitating the wiping off of the resulting coating film, the content of the curing agent is preferably restricted. By the resin composition according to the present disclosure, excellent blocking resistance can be obtained even when the content of the curing agent is low.

As the curing agent, a curing agent known as a curing agent for use in a coating material can be selected and used as appropriate. Specific examples thereof include an isocyanate-based curing agent, a blocked isocyanate-based curing agent, an aminoplast-based curing agent, a polycarboxylic acid-based curing agent, and a polyamine-based curing agent. The curing agent is preferably selected taking into consideration the type of curing reactive site included in the fluororesin, curing properties and the like. The curing agent used in combination with the specific fluororesin is preferably an isocyanate-based curing agent, a blocked isocyanate-based curing agent, or an aminoplast-based curing agent. One kind of the curing agent may be used singly, or two of more kinds thereof may be used in combination.

From the above-described viewpoints, it is preferable that the resin composition does not contain a curing agent, or that the resin composition contains a curing agent in such an amount that the molar ratio of curable groups in the curing agent to hydroxy groups in the specific fluororesin (namely, the number of moles of curable groups in the curing agent/the number of moles of hydroxy groups in the specific fluororesin) is 1.0 or less, more preferably 0.5 or less, and still more preferably 0.4 or less. The above-described molar ratio may be 0.3 or less, or may be 0.2 or less. In a case in which the resin composition contains a curing agent, the above-described molar ratio is preferably 0.05 or more, from the viewpoint of obtaining excellent water resistance, solvent resistance, and blocking resistance. The term “curable group” as used herein refers to a functional group that undergoes a curing reaction with a hydroxy group in the specific fluororesin.

For example, in a case in which the use of an isocyanate group-containing curing agent as a curing agent is envisaged, it is preferable that the resin composition does not contain the isocyanate group-containing curing agent, or contains the curing agent in such an amount that the molar ratio of isocyanate groups in the isocyanate group-containing curing agent to hydroxy groups in the specific fluororesin ([NCO]/[OH]) in the resin composition is within the ranges described above.

In the case of using a curing agent that causes a curing reaction to occur at 25 °C, the resin composition is preferably formed as a two-component curable resin composition, in which a main agent including the specific fluororesin and the curing agent are prepared separately, and are mixed at the time of forming a coating film. Any other components that do not react with the specific fluororesin are preferably incorporated into the main agent. In the case of using the two-component curable resin composition, the resin composition obtained by mixing the main agent and the curing agent is coated on a substrate, and the composition is dried at normal temperature to form a coating film on the substrate.

In the case of using a curing agent that causes a curing reaction to occur by heating, the curing agent and the specific fluororesin can coexist in the resin composition, and thus the resin composition can be formed as a one-component curable resin composition. In this case, the resin composition is coated on a substrate and baked to form a coating film on the substrate.

Examples of the curing agent that causes a curing reaction to occur at 25 °C include a non-yellowing diisocyanate (e.g., hexamethylene diisocyanate, or isophorone diisocyanate), and a polyisocyanate-based curing agent (e.g., an adduct or a multimer of a non-yellowing diisocyanate).

Examples of the curing agent that causes a curing reaction to occur by heating include a blocked isocyanate-based curing agent, and an aminoplast-based curing agent.

In particular, a polyisocyanate-based curing agent having an isocyanate group is useful. In this case, it is preferable to further add a curing catalyst, such as dibutyltin dilaurate, to accelerate the curing.

<Other Components>

The resin composition according to the present disclosure may contain any other components other than the components described above. For example, the resin composition may contain a resin other than the specific fluororesin and the esterified cellulose resin, and/or may contain any of various types of additives, such as a pigment, a UV absorber, a near-infrared absorbing pigment, a near-infrared reflective pigment, a blocking resistance improver, a lubricant and the like. One kind of said component may be used singly, or two or more kinds thereof may be used in combination.

(Resin Other than Specific Fluororesin and Esterified Cellulose Resin)

The resin other than the specific fluororesin and the esterified cellulose resin may be, for example, a polyester resin, an acrylic resin, an epoxy resin, or a fluororesin other than the specific fluororesin. The fluororesin other than the specific fluororesin may be, for example, a tetrafluoroethylene-hexafluoropropylene-vinylidene fluoride copolymer (hereinafter, also referred to as “THV”), a fluoroethylene-vinyl ester copolymer, or polytetrafluoroethylene (hereinafter, also referred to as “PTFE”).

In a case in which the resin composition contains a resin other than the specific fluororesin and the esterified cellulose resin, the content of said resin is preferably 30% by mass or less, more preferably 20% by mass or less, and still more preferably 10% by mass or less, with respect to the total mass of the resin in the resin composition. When mentioning the amount or content of the resin, if a component used as an additive is a resin, the foregoing amount or content is defined to refer to the amount or content including that of the resin used as the additive.

(Pigment)

The resin composition according to the present disclosure may contain a coloring pigment such as an organic pigment or an inorganic pigment. The pigment may be, for example: carbon black, which is a black pigment; iron oxide, which is a red pigment; aluminum cobalt oxide, which is a blue pigment; copper phthalocyanine, which is a blue pigment or a green pigment; perylene, which is a red pigment; or bismuth vanadate, which is a yellow pigment.

The resin composition according to the present disclosure may contain an aluminum-based pigment for adjusting visible light reflectance and solar reflectance. The aluminum-based pigment may be, for example, aluminum particles such as aluminum flakes, or aluminum particles whose surfaces are coated with an organic substance or an inorganic substance (surface-treated aluminum particles).

The organic substance in the surface-treated aluminum particles may be, for example, a resin, a fatty acid or a silane coupling agent, and the inorganic substance may be, for example, an inorganic oxide, such as silica, or a metal other than aluminum. Above all, from the viewpoint that the visible light reflectance and the solar reflectance are less likely to decrease over a long period of time, aluminum particles coated with an acrylic resin or silica are particularly preferable. Aluminum particles coated with an acrylic resin or silica are hereinafter referred to as "specific aluminum composite particles".

The total coating amount of the acrylic resin and silica in the specific aluminum composite particles is preferably from 3 to 30 parts by mass, more preferably from 3 to 25 parts by mass, and still more preferably from 4 to 20 parts by mass, with respect to 100 parts by mass of the aluminum particles. When the total coating amount of the acrylic resin and silica is equal to or higher than the lower limit values of the ranges described above, the aluminum particles are sufficiently protected by the acrylic resin or silica, and thus, the solar reflectance of the resulting coating film is less likely to decrease over a long period of time. When the total coating amount of the acrylic resin and silica is equal to or lower than the upper limit values of the ranges described above, dissolution of aluminum particles owing to degradation of the acrylic resin, or dissolution of aluminum particles during a weather resistance test, owing to the occurrence of cracks in the interior of silica and infiltration of water, tends to be reduced. As a result, the solar reflectance is less likely to decrease over a long period of time.

In the case in which the resin composition contains the specific aluminum composite particles, the content of the specific aluminum composite particles is preferably from 10 to 35% by mass, more preferably from 15 to 35% by mass, and still more preferably from 20 to 30% by mass, with respect to the total mass of the resin composition, from the viewpoint of the balance between the solar reflectance, the viscosity of the resin composition, the adhesion and the like.

The amount of the pigment in the resin composition is preferably from 10 to 200 parts by mass, and more preferably from 30 to 150 parts by mass, with respect to 100 parts by mass of the total amount of the resin in the resin composition. In the case of referring to the amount or content of the pigment, the above-described amount or content is defined to refer to the amount or content including that of the near-infrared absorbing pigment, the near-infrared reflective pigment and the like, which are described later.

(UV Absorber)

The UV absorber may be, for example, an inorganic UV absorber or an organic UV absorber.

Examples of the inorganic UV absorber include: inorganic particles, such as particles of zinc oxide, titanium oxide, cerium oxide, and iron oxide; and inorganic composite particles obtained by coating the surfaces of the inorganic particles with an inorganic substance, such as silica, alumina or zirconia.

Examples of the organic UV absorber include a triazine-based UV absorber and a benzophenone-based UV absorber, and a triazine-based UV absorber is preferable. In particular, a hydroxyphenyltriazine-based UV absorber, such as 2-(2-hydroxy-4-[1-octyloxycarbonylethoxy]phenyl)-4,6-bis(4-phenylphenyl)-1,3,5-triazine (trade name: TINUVIN 479, manufactured by BASF Japan Ltd.), 2,4-bis[2-hydroxy-4-butoxyphenyl]-6-(2,4-dibutoxyphenyl)-1,3,5-triazine (trade name: TINUVIN 460, manufactured by BASF Japan Ltd.), or 2-[4-[(2-hydroxy-3-(2'-ethyl)hexyloxy]-2-hydroxyphenyl]-4,6-bis(2,4-dimethylphenyl)-1,3,5-triazine (trade name: TINUVIN 405, manufactured by BASF Japan Ltd.), is preferable.

(Near-Infrared Absorbing Pigment and Near-Infrared Reflective Pigment)

The near-infrared absorbing pigment or the near-infrared reflective pigment may be, for example: a boronated compound, such as lanthanum hexaboride, which is a green pigment; a tungsten compound, such as cesium tungstate, which is a blue pigment; indium tin oxide, which is a pale blue pigment; or antimony tin oxide, which is a blue pigment.

(Blocking Resistance Improver)

Examples of the blocking resistance improver (excluding the esterified cellulose resin) include a silicon compound, a chlorinated polyethylene and acrylic resin beads. The amount of the blocking resistance improver (excluding the esterified cellulose resin) is preferably from 0.1 to 5 parts by mass with respect to 100 parts by mass of the resin composition.

(Lubricant)

Examples of the lubricant include: a polyolefin-based wax, such as a polyethylene wax; and various types of waxes, such as a fatty acid amid, a fatty acid ester, a paraffin wax, polytetrafluoroethylene (PTFE) wax and a carnauba wax.

(Other Additives)

The resin composition according to the present disclosure may contain additive(s) other than those described above as necessary, such as an anti-settling agent, a plasticizer, a dispersion stabilizer, a filler, an antioxidant, an antistatic agent, a delustering agent (e.g., silica or alumina), a tack improver (e.g., a polyolefin), or an adhesion improver (e.g., a silane coupling agent).

<Solvent>

A solvent may be added to the resin composition according to the present disclosure, from the viewpoint of obtaining excellent coating properties. The solvent may be any solvent capable of dissolving or dispersing the specific fluororesin, and can be selected as appropriate depending on the method of coating, taking into consideration the repellency on a substrate, transfer rate, drying properties, storage stability and the like, of the resulting coating material.

The solvent may be, for example, an aqueous solvent or an organic solvent. One kind of the solvent may be used singly, or two or more kinds thereof may be used in combination.

Examples of the organic solvent include toluene, xylene, ethylbenzene, methyl ethyl ketone, and ethyl acetate.

In gravure printing, a solvent that allows the resulting coating material to have a viscosity of from 15 to 30 seconds as measured using a #3 Zahn cup is preferable, for the purpose of reducing printing defects such as coating unevenness and bleeding.

In ink-jet printing, a solvent having a high boiling point may further be added, so that the injection nozzle from which the coating material is injected does not dry out.

In a case in which the resin composition contains a solvent, the content of the solvent is preferably from 30 to 90% by mass, and more preferably from 40 to 80% by mass, with respect to the total mass of the resin composition (including the solvent). The content of the components other than the solvent in the resin composition is preferably from 10 to 70% by mass, and more preferably from 20 to 60% by mass, with respect to the total mass of the resin composition (including the solvent).

In the present disclosure, in a case in which the resin composition contains a solvent, when referring to the amount or content of each component in the resin composition other than the solvent, the above-described amount or content is defined to refer to the amount or content thereof in the resin composition excluding the solvent.

The resin composition preferably has a viscosity of from 15 to 30 seconds as measured using a #3 Zahn cup.

[Applications of Resin Composition]

The resin composition according to the present disclosure can be suitably used as a coating material. In particular, the resin composition according to the present disclosure is useful in that, in a case in which the resin composition is used as a coating material for being applied to a substrate including a fluororesin, both favorable adhesion and blocking resistance can be achieved along with properties such as weather resistance and the like. The details of the substrate including a fluororesin are as described later.

<<Layered Body>>

A layered body according to the present disclosure include: a substrate; and a coating film formed from the resin composition according to the present disclosure. Specific examples of the layered body will be described below with reference to the drawings.

FIG. 1 is a cross-sectional view showing an example of a layered body in one embodiment of the present disclosure. The layered body 10 is a so-called top printed layered body that includes: a substrate 12; and a coating film 14 formed on the surface of the substrate 12 on the side on which sunlight L is incident.

Figure 2:
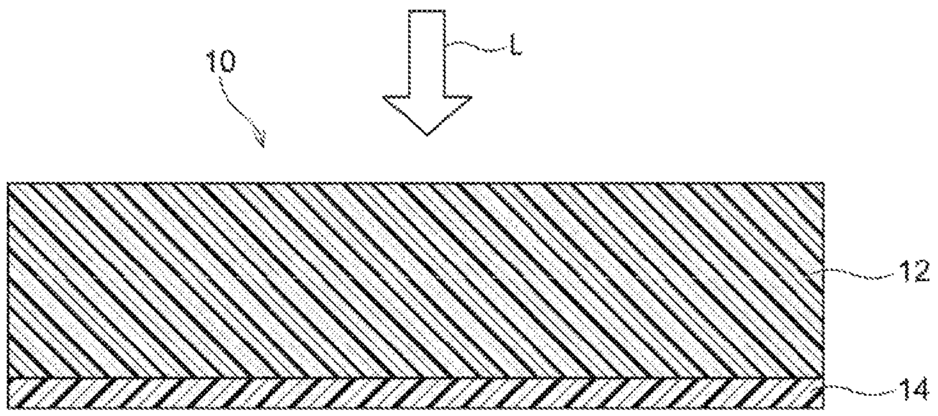
FIG. 2 is a cross-sectional view showing another example of a layered body in one embodiment of the present disclosure.

FIG. 2 is a cross-sectional view showing another example of a layered body in one embodiment of the present disclosure. The layered body 10 is a so-called back printed layered body that includes: a substrate 12; and a coating film 14 formed on the surface of the substrate 12 opposite from the side on which sunlight L is incident.

While the coating film 14 shown in each of FIG. 1 and FIG. 2 is formed only on one side of the substrate 12, the coating film 14 may be formed on both sides of the substrate 12.

The coating film 14 may be formed over the entire area of the substrate 12 as shown in FIG. 1 and FIG. 2, or may be formed on a part of the area thereof.

<Substrate>

(Fluororesin)

The substrate includes a fluororesin. The fluororesin included in the substrate is preferably a homopolymer or a copolymer of a fluoroolefin. Examples of the fluoroolefin include fluoroolefins described above as structural units of the specific fluororesin. One kind of the fluororesin may be used singly, or two or more kinds thereof may be used in combination.

The copolymer of a fluoroolefin may be, for example, a copolymer of two or more kinds of fluoroolefins, or a copolymer of one or more kinds of fluoroolefins and one or more kinds of olefins or perfluoro(alkyl vinyl ether)s. The fluoroolefins and olefins preferably have 2 or 3 carbon atoms. The perfluoro(alkyl vinyl ether)s preferably have from 3 to 6 carbon atoms.

A preferable fluororesin may be, for example, a vinyl fluoride polymer (hereinafter, also referred to as "PVF"), a vinylidene fluoride polymer (hereinafter, also referred to as "PVDF"), a vinylidene fluoride-hexafluoropropylene copolymer, THV, a tetrafluoroethylene-propylene copolymer, a tetrafluoroethylene-vinylidene fluoride-propylene copolymer, an ethylene-tetrafluoroethylene copolymer (hereinafter, also referred to as "ETFE"), a hexafluoropropylene-tetrafluoroethylene copolymer (hereinafter, also referred to as "FEP"), an ethylene-hexafluoropropylene-tetrafluoroethylene copolymer (hereinafter, also referred to as "EFEP"), a perfluoro(alkyl vinyl ether)-tetrafluoroethylene copolymer (hereinafter, also referred to as "PFA"), a chlorotrifluoroethylene polymer (hereinafter, also referred to as "PCTFE"), or an ethylene-chlorotrifluoroethylene copolymer (hereinafter, also referred to as "ECTFE"). The fluororesin is particularly preferably ETFE.

The fluororesin included in the substrate preferably has a fluorine atom content of 45% by mass or more, more preferably 50% by mass or more, and still more preferably 55% by mass or more. When the fluorine atom content of the fluororesin is equal to or higher than the lower limit values of the ranges described above, the substrate has even superior weather resistance, contamination resistance, chemical resistance and non-tackiness, and in particular, an excellent non-tackiness and contamination resistance. The fluorine atom content is measured using a fluoride ion-selective electrode in combination with gas chromatography after burning the fluororesin.

The fluororesin included in the substrate is preferably a resin capable of being formed into a film. The fluororesin included in the substrate is preferably a polymer having excellent weather resistance, and having a stress at 10% elongation of 10 MPa or more. The value of the stress at 10% elongation is determined by the method defined in JIS K7127:1999 (Plastics—Test Method for Tensile Properties—Part 3: Test Conditions for Films and Sheets). The value of the stress is calculated by dividing the value of tension, as measured using a #5 dumbbell as a test piece and by stretching the test piece at a tensile speed of 200 mm/min, by the cross-section area of an original film. The stress at 10% elongation does not vary depending on the thickness of the film, and varies greatly depending on the composition of the fluororesin. When the stress at 10% elongation is 10 MPa or more, an excellent snow cover resistance and wind pressure resistance can be obtained.

The content of the fluororesin is preferably 60% by mass or more, more preferably 70% by mass or more, still more preferably 90% by mass or more, and may be 100% by mass, with respect to the total mass of the substrate. When the content of the fluororesin is equal to or higher than the lower limit values of the ranges described above, the substrate has even superior weather resistance.

(Other Components)

The substrate may further include a non-fluorine-based resin, a known additive, or the like. The known additive may be, for example, a colored pigment, a UV absorber, a near-infrared absorbing pigment, or a near-infrared reflective pigment.

The colored pigment may be, for example: titanium oxide, which is a white pigment; aluminum cobalt oxide, which is a blue pigment; or iron oxide, which is a red pigment.

The UV absorber may be, for example, an inorganic UV absorber or an organic UV absorber. Examples of the inorganic UV absorber include: inorganic particles, such as particles of zinc oxide, titanium oxide, cerium oxide, and iron oxide; and inorganic composite particles obtained by coating the surfaces of the inorganic particles with an inorganic substance, such as silica, alumina, or zirconia.

The near-infrared absorbing pigment or the near-infrared reflective pigment may be, for example, a boronated compound, such as lanthanum hexaboride, a tungsten compound, such as cesium tungstate, indium tin oxide, or antimony tin oxide.

In a case in which the coating film has a light reflecting function, from the viewpoint of not inhibiting the light reflecting function of the coating film, the substrate preferably has optical transparency. The substrate preferably has a total light transmittance of 70% or more, and more preferably 85% or more. In the present disclosure, the "total light transmittance" is a value measured in accordance with JIS K7375:2008 "Plastics—Method for Determining Total Light Transmittance and Total Light Reflectance".

The substrate preferably has a thickness of from 25 to 1,000 and more preferably from 100 to 500 μm. When the thickness of the substrate is equal to or higher than the lower limit values of the ranges described above, the substrate has an excellent mechanical strength. When the thickness of the substrate is equal to or lower than the upper limit values of the ranges described above, the substrate has excellent optical transparency. The form of the substrate is not particularly limited, and the substrate is preferably in the form of a film.

The surface of the substrate on which the coating film is to be formed is preferably surface-treated to achieve an increased surface tension, from the viewpoint of obtaining excellent adhesion between the substrate and the coating film. By performing the surface treatment, polar groups, such as formyl groups, carboxy groups, and hydroxy groups, are formed on the surface of the substrate, and the polar groups on the surface of the substrate form chemical bonds with hydroxy groups in the specific fluororesin included in the coating film, to improve the adhesion between the substrate and the coating film. The surface treatment may be, for example, a corona discharge treatment, a metallic sodium treatment, a mechanical surface roughening treatment, or an excimer laser treatment. From the viewpoint of the high treatment speed and requiring no washing after the treatment, a corona discharge treatment is preferable.

The substrate preferably has a surface tension of 0.035 N/m or more, and more preferably 0.04 N/m or more. When the surface tension of the substrate is equal to or higher than the lower limit values of the ranges described above, an even superior adhesion between the substrate and the coating film can be obtained. The upper limit of the surface tension of the substrate is not particularly limited, and may be, for example, 0.06 N/m.

<Coating Film>

The coating film is a film formed on the substrate, and formed using the resin composition described above. In a case in which the resin composition contains a solvent, the coating film refers to a film obtained after applying the resin composition to the substrate and removing the solvent from the coated composition. The coating film may be a solidified film obtained after applying the resin composition to the substrate and simply removing the solvent from the coated composition, or may be a cured film obtained by curing the coated resin composition by heating or the like.

In the present disclosure, in both cases in which a film formed from the resin composition is provided on the entire area of a surface, and in which the film is provided on a portion of a surface, the film corresponds to the "coating film".

The ratio of the area of the coating film with respect to the area of the substrate on one side of the substrate may be selected as appropriate depending on the purpose and the like, and the ratio is, for example, from 10 to 100%. More specifically, the area of the coating film may be, for example, less than 95%, less than 90%, or less than 80%, with respect to the total area of one side of the substrate. Further, the area of the coating film may be 80% or more, 90% or more, or 95% or more, with respect to the total area of one side of the substrate.

The coating film may be formed on one side of the substrate, or on both sides of the substrate.

The coating film may consist of one layer, or may include two or more layers.

The thickness of the coating film (in a case in which the film includes two or more layers, the total thickness thereof) is preferably from 0.5 to 10 μm, and more preferably from 1 to 6 μm. When the thickness of the coating film is equal to or lower than the upper limit values of the ranges described above, the coating film tends to be able to conform to the deformation of the substrate, such as expansion and contraction, bending and the like, and tends to be less likely to peel off from the substrate.

The method of forming the coating film is not particularly limited, and the following methods can be used, for example.

A method in which the resin composition is coated on the substrate by a known coating method, such as gravure printing, screen printing, tampo printing, ink-jet printing, brush coating, spray coating or die coating, and in a case in which the resin composition contains a solvent, the solvent is removed, to form a coating film.

A method in which the resin composition is coated on a transfer film by a known coating method, and in a case in which the resin composition contains a solvent, the solvent is removed, to form a coating film, and the coating film formed on the transfer film is transferred onto the substrate using a hot roll or the like.

As the method of forming the coating film, from the viewpoints of positioning accuracy, productivity and the like, gravure printing, screen printing, tampo printing, and ink-jet printing are preferable, and gravure printing is more preferable.

In the coating method, the method of removing the solvent after coating the resin composition on the substrate may be, for example, heat drying, vacuum drying, vacuum heat drying, or the like. In the case of performing heat drying or vacuum heat drying, the drying is preferably performed at a heating temperature of from 30 to 150 °C, and more preferably from 60 to 120 °C. The drying may be performed only once, or may be performed more than once.

In a case in which the resin composition according to the present disclosure is a resin composition containing a curing agent, the coating film may be formed by curing the resin composition by heating, for example, at a temperature of from 40 to 80 °C.

The surface of the coating film may be subjected to a surface treatment for the purpose of improving the adhesion thereof, in view of further forming a functional layer described below on the coating film. The surface treatment may be, for example, the same treatment as the surface treatment that may be performed on the substrate.

<Layer Other than Substrate and Coating Film Formed from Resin Composition According to Present Disclosure>

The layered body may further include a layer other than the substrate and the coating film formed from the resin composition according to the present disclosure.

For example, the layered body may further include a functional layer on the coating film formed from the resin composition according to the present disclosure. The functional layer can be formed by, for example, coating, transfer using a transfer film, or sputtering. The functional layer may consist of one layer, or may include two or more layers.

In the present disclosure, the term "functional layer" refers to a layer that imparts a function of interest to the layered body. Examples of the function of interest to be imparted to the layered body include a design, optical properties (e.g., UV absorbability, UV reflectivity, near-infrared absorbability, and near-infrared reflectivity), and durability.

A composition for forming a functional layer may contain, as a component for imparting a function of interest to the layered body, for example, any of the pigments, UV absorbers, UV reflective agents, near-infrared absorbing pigments, near-infrared reflective pigments, curing agents and the like, described above as the components of the resin composition.

The functional layer tends to favorably adhere to the coating film. It is believed that this is partly because the esterified cellulose resin that is unevenly located at the surface of the coating film is partly dissolved in or mixed with the components of the functional layer.

Further, the layered body may include an adhesive layer between the substrate and the coating film formed from the resin composition according to the present disclosure, or between the coating film formed from the resin composition according to the present disclosure and another certain layer. The adhesive layer may be, for example, a layer formed by coating a silane coupling agent.

Examples of preferable layer configurations in a case in which the layered body includes a layer other than the substrate and the above-described coating film include the following configurations.

A layered body that includes a substrate, the above-described coating film, and a functional layer, in this order. The layered body optionally includes adhesive layer(s) between the respective layers. The functional layer in this case may be a layer provided for the purpose of imparting, for example, a design, curability, adhesion, or optical properties.

A layered body that includes a substrate, the above-described coating film, a first functional layer, and an optional a second functional layer, in this order. The layered body optionally includes adhesive layer(s) between the respective layers. The resin composition according to the present disclosure may be used for forming at least one selected from the group consisting of the first functional layer and the second functional layer. In this case, the first functional layer may be a layer provided for the purpose of imparting, for example, curability, adhesion, or optical properties, and the second functional layer may be a layer provided for the purpose of imparting a design or the like.

[Application of Layered Body]

The application of the layered body according to the present disclosure is not particularly limited. Examples of the application of the layered body include: membrane materials (e.g., roofing materials, exterior wall materials, skylight materials, water proof sheets, and curing sheets) for use in membrane structure facilities (sports facilities (e.g., swimming pools, gymnasia, tennis courts, soccer fields and athletic stadiums), warehouses, assembly halls, exhibition halls, horticultural facilities (e.g., horticultural greenhouses and agricultural greenhouses), arcades and the like; membrane materials for screens; sound barriers; windbreak fences; fences for overtopping waves; highway side walls; garage canopies; membrane materials for shopping malls; walkway walls; glass shatterproof films; heat resistant sheets; waterproof sheets; tent materials for tent warehouses; membrane materials for solar radiation control; partial roofing materials for skylights; glass substitute window materials; membrane materials for flameproof partitions; curtains; membrane materials for outer wall reinforcement; waterproof membranes; smoke barriers; incombustible transparent partitions; membrane materials for road reinforcement; indoor furnishings and materials (e.g., lights, wall surfaces, and blinds); outdoor structures (e.g., tents and signboards); automobile materials (e.g., convertible tops, damping materials, and bodies); aircraft materials; marine vessel materials; exteriors for consumer electronics; inner walls of tanks, containers and the like; filters; and membrane materials for construction. In one embodiment, the layered body according to the present disclosure is particularly suitably used as a membrane material for a membrane structure facility, a screen, a signboard, or solar radiation control.

EXAMPLES

Embodiments of the present disclosure will be described below with reference to Examples. However, the embodiments of the present disclosure are not limited to the following Examples. Examples 2, 3, 5 to 7, 9 to 11, and 13 to 24 are working examples, and Examples 1, 4, 8, and 12 are comparative examples.

Materials used in each of the Examples are as follows.

[Specific Fluororesins]

LF200MEK (solid content: 60% by mass, solvent: methyl ethyl ketone, hydroxy value:31 mg (KOH)/g; manufactured by AGC Inc.) was used as a solution of specific fluororesin 1. The resin of LF200MEK has an alternating copolymer of fluoroethylene and hydroxyalkyl vinyl ether in its main chain.

LF600 (solid content: 50% by mass, solvent: xylene: ethylbenzene:toluene=13:12:25 (mass ratio), hydroxy value: 27 mg (KOH)/g; manufactured by AGC Inc.) was used as a solution of specific fluororesin 2. The resin of LF600 has an alternating copolymer of fluoroethylene and hydroxyalkyl vinyl ether in its main chain.

[Specific Aluminum Composite Particles]

EMR-D5660 (trade name; manufactured by Toyo Aluminium K.K.), which is an aluminum paste in the form of a paste containing a liquid medium, was used as the specific aluminum composite particles. This aluminum paste contains 49.5% by mass of flattened particles, in which the surfaces of flattened aluminum particles are coated with silica in an amount of 15% by mass with respect to 100% by mass of aluminum, and contains 50.5% by mass of propylene glycol monomethyl ether as a solvent. The aluminum composite particles described above have an average major axis diameter of 9

[Esterified Cellulose Resin]

The following resins were used as esterified cellulose resins.

Esterified cellulose resin 1: CAB-381-2 (trade name; glass transition temperature: 133 °C, number average molecular weight: 40,000, hydroxy group content: 1.3% by mass; manufactured by Eastman Chemical Japan Ltd.)

Esterified cellulose resin 2: CAB-551-0.01 (trade name; glass transition temperature: 85 °C, number average molecular weight: 16,000, hydroxy group content: 1.5% by mass; manufactured by Eastman Chemical Japan Ltd.)

Esterified cellulose resin 3: CAP-482-0.5 (trade name; glass transition temperature: 142 °C, number average molecular weight: 25,000, hydroxy group content: 2.6% by mass; manufactured by Eastman Chemical Japan Ltd.)

Each of the esterified cellulose resins was dissolved in methyl ethyl ketone (MEK) to prepare a CAB solution or a CAP solution having a solid concentration of 20%, and then blended in the coating material as a component thereof

[Curing Agent]

A polyisocyanate of hexamethylene diisocyanate (trade name: DURANATE A201H, manufactured by Asahi Kasei Corporation) was used. This curing agent has an NCO content of 17.2% by mass.

[UV Absorber]

TINUVIN 479 (manufactured by BASF Japan Ltd.), which is a hydroxyphenyltriazine-based UV absorber, was used as the UV absorber.

Methods of evaluating the working examples and the comparative examples are as follows.

<Evaluation Methods>

(Adhesion)

In accordance with JIS K5600-5-6:1999, cuts were made in the form of a lattice in each coating film formed on a fluororesin film, the lattice including 10×10 squares having a size of 1 mm×1 mm, and a piece of a cellophane tape (trade name: CT18, manufactured by Nichiban Co., Ltd.) was pasted thereon and peeled off. The number of squares peeled off out of the 100 squares was counted, and the adhesion of the coating film was evaluated in accordance with the following evaluation criteria. The test method described above is also referred to as "cross-cut CELLOTAPE (registered trademark) peeling test".

A: Excellent (0 to less than 2 squares were peeled off)

B: Good (2 to less than 20 squares were peeled off)

C: Poor (20 or more squares were peeled off)

Those evaluated as A or B were deemed to have passed the test.

(Visible Light Transmittance and Visible Light Reflectance)

The visible light transmittance and visible light reflectance of each of the coating films were measured using a spectrophotometer (UV-3100PC, manufactured by SHIMADZU Corporation), in accordance with JIS R3106:1998 "Testing method on transmittance, reflectance, and emittance of flat glasses and evaluation of solar heat gain coefficient". These optical properties were measured by irradiating light from the side of the fluororesin film. The visible light reflectance was measured for coating films that contain the specific aluminum composite particles, which are a bright pigment, as a main pigment, and the visible light transmittance was measured for coating films that contain titanium oxide, aluminum cobalt oxide, or copper cyanine green as a main pigment.

(Blocking Test)

Fluororesin films having a coating film printed thereon were layered such that the surfaces of the coating films face each other, a metal plate was placed on the layered films such that a pressure of 10 N/cm$^2$ was applied thereto, and the layered films were introduced into a thermostatic chamber controlled at a constant temperature, and were allowed to stand for 15 hours. Thereafter, the layered fluororesin films were cooled down to 25 °C, and were peeled off from each other after an hour. At this time, those in which the coating films were adhered with each other, even partially, were regarded to be ones in which the blocking occurred. The test was carried out at a test temperature of from 30 to 70 °C, at increments of 5 °C.

The term "blocking test passing temperature" refers to the highest temperature at which the blocking did not occur. For example, in a case in which the blocking test passing temperature is 40 °C, it means that the blocking did not occur at 40 °C, but the blocking occurred at 45 °C. Those in which the blocking test passing temperature was 45 °C or higher were regarded to have passed the test in overall evaluation.

(Accelerated Weather Resistance Test)

A 5,000-hour accelerated weather resistance test was carried out using a sunshine weather meter (trade name: 300 SUNSHINE WEATHER METER, manufactured by Suga Test Instruments Co., Ltd.) equipped with a carbon arc lamp in accordance with JIS K7350-4:2008. The accelerated weather resistance test was carried out by both top exposure in which light is incident on the side of the coating film and water is sprayed on the side of the coating film, and back exposure in which light is incident on the side of the substrate and water is sprayed on the side of the substrate. After the accelerated weather resistance test, the adhesion of each of the coating films was evaluated.

Example 1

An ETFE film (trade name: FLUON ETFE FILM 250NJ, manufactured by AGC Inc.) having a thickness of 250 μm was subjected to a corona discharge treatment in the air on its surface at a treatment density of 150 W·min/m$^2$. The surface tension of the surface subjected to the corona discharge treatment was 0.054 N/m.

A coating material was prepared in accordance with the composition shown in Table 1. The solution of the specific fluororesin 1, the specific aluminum composite particle paste, and a mixed solvent of toluene and MEK with a mass ratio of toluene/MEK=50/50, were mixed and stirred to obtain a silver-colored paste. The resulting coating material had a viscosity of 25 seconds as measured using a #3 Zahn cup.

Subsequently, the prepared coating material was gravure printed on the corona discharge-treated side of the ETFE film that had been subjected to the corona discharge treatment, and dried at 120 °C for one minute to obtain a layered body. The resulting coating film had a thickness of 2 μm. The composition of the coating material, the content of each component in the coating material excluding the solvent, and evaluation results, are shown in Table 1.

Examples 2 to 18

Layered bodies were obtained in the same manner as in Example 1, except that the compositions of the respective coating materials were changed. The mixed solvent of toluene and MEK with a mass ratio of toluene/MEK=50/50 was mixed such that each coating material had a viscosity of from 22 to 26 seconds as measured using a #3 Zahn cup. Each of the dried coating film had a thickness of 2 μm. The compositions of the coating materials, the contents of the components in the coating materials excluding the solvent, and evaluation results are shown in Tables 1 and 2.

It was confirmed that, out of Examples 1 to 18, the layered bodies of Examples 2, 3, 5 to 7, 9 to 11 and 13 to 18, in which the resin composition according to the present disclosure was used, had excellent blocking resistance and adhesion.

In contrast, the layered bodies of Examples 1 and 12, to which CAB was not added, and the layered body of Example 4, in which the amount of CAB is less than 0.2 parts by mass with respect to 100 parts by mass of the specific fluororesin 1, had a blocking test passing temperature of less than 45 °C.

The layered body of Example 8, in which the amount of CAB is more than 9 parts by mass with respect to 100 parts by mass of the specific fluororesin 1, showed an insufficient adhesion.

Further, it was confirmed that the layered bodies of Examples 9 to 11, 14, 16 and 18, in which a curing agent was used, had a high blocking test passing temperature.

Examples 19 and 20

Coating materials were prepared with the compositions shown in Table 3. Both of the coating materials of Example 19 and Example 20 had a viscosity of 25 seconds as measured using a #3 Zahn cup. Subsequently, layered bodies were obtained in the same manner as in Example 1.

In each of Example 19 and Example 20, using the coating film formed from the coating material prepared above as a transparent primer layer, a UV curable acrylic ink (ECO-UV INK, manufactured by Roland DG Corporation) was further printed on the coating film by ink-jet printing using a printer, LEC-540 (manufactured by Roland DG Corporation), and UV-cured by the UV irradiation mechanism integrated in the printer to obtain a layered body. The compositions of the coating materials, the contents of the components in the coating materials excluding the solvent, and evaluation results are shown in Table 1. The results revealed that these coating films are useful also as a primer layer for ink-jet printing, or as a primer layer for further forming a coating film using a coating material containing a solvent.

Further, the coating material prepared in Example 2 was gravure-printed on the coating film prepared in each of Example 19 and Example 20, and the formed coating films were subjected to the cross-cut CELLOTAPE (registered trademark) peeling test. As shown in Table 3, the coating films formed from the coating material prepared in Example 2 had an excellent adhesion.

The coating films prepared in Examples 2, 3, 5 to 7, 9 to 11 and 13 to 20 maintained a favorable cohesion in the cross-cut CELLOTAPE (registered trademark) peeling test without resulting in a cohesive failure mode in which the coating film sticks to both the cellophane tape and the fluororesin film.

TABLE 1

| | | Example 1 | Example 2 | Example 3 | Example 4 | Example 5 | Example 6 |
|---|---|---|---|---|---|---|---|
| Compositions of coating materials (parts by mass) | Specific aluminum composite particle paste | 30 | 30 | 30 | 30 | 30 | 30 |
| | Solution of specific fluororesin 1 | 70 | 70 | 70 | 70 | 70 | 70 |
| | Solvent (MEK/toluene = 50/50) | 25 | 22 | 22 | 23 | 20 | 15 |
| | Solution of esterified cellulose resin 1 | 0 | 3 | 0.5 | 0.2 | 7 | 12 |
| | Curing agent | 0 | 0 | 0 | 0 | 0 | 0 |
| Contents in coating materials excluding solvent (% by mass) | Specific aluminum composite particles | 26.1 | 25.8 | 26.1 | 26.1 | 25.5 | 25.1 |
| | Specific fluororesin 1 | 73.9 | 73.1 | 73.7 | 73.8 | 72.1 | 70.9 |
| | Esterified cellulose resin 1 | 0.0 | 1.0 | 0.2 | 0.1 | 2.4 | 4.1 |
| | Curing agent | 0.0 | 0.0 | 0.0 | 0.0 | 0.0 | 0.0 |
| Molar ratio of isocyanate groups in curing agent to hydroxy groups in specific fluororesin 1 [NCO]/[OH] | | 0.0 | 0.0 | 0.0 | 0.0 | 0.0 | 0.0 |
| Amounts of CAB with respect to 100 parts by mass of Specific fluororesin 1 (% by mass) | | 0.00 | 1.43 | 0.24 | 0.10 | 3.33 | 5.71 |
| Initial physical properties | Visible light reflectance (%) | 62.4 | 62.9 | 61.4 | 61.5 | 60.3 | 60.4 |
| | Blocking test passing temperature (° C.) | 30 | 45 | 45 | 40 | 50 | 60 |
| | Cross-cut CELLOTAPE peeling test | A | A | A | A | A | A |
| After weather resistance test | Cross-cut CELLOTAPE peeling test after back exposure | A | A | A | A | A | A |
| | Cross-cut CELLOTAPE peeling test after top exposure | A | A | A | A | A | A |

| | | Example 7 | Example 8 | Example 9 | Example 10 | Example 11 |
|---|---|---|---|---|---|---|
| Compositions of coating materials (parts by mass) | Specific aluminum composite particle paste | 30 | 30 | 30 | 30 | 30 |
| | Solution of specific fluororesin 1 | 70 | 70 | 70 | 70 | 70 |
| | Solvent (MEK/toluene = 50/50) | 6 | 5 | 22 | 22 | 23 |
| | Solution of esterified cellulose resin 1 | 18 | 35 | 3 | 2 | 1 |
| | Curing agent | 0 | 0 | 1 | 2 | 3 |
| Contents in coating materials excluding solvent (% by mass) | Specific aluminum composite particles | 24.6 | 23.3 | 25.4 | 25.0 | 24.7 |
| | Specific fluororesin 1 | 69.5 | 65.8 | 71.9 | 70.9 | 69.9 |
| | Esterified cellulose resin 1 | 6.0 | 11.0 | 1.0 | 0.7 | 0.3 |
| | Curing agent | 0.0 | 0.0 | 1.7 | 3.4 | 5.0 |
| Molar ratio of isocyanate groups in curing agent to bvdroxy groups in specific fluororesin 1 [NCO]/[OH] | | 0.0 | 0.0 | 0.11 | 0.21 | 0.32 |

TABLE 1-continued

| | | | | | | |
|---|---|---|---|---|---|---|
| Amounts of CAB with respect to 100 parts by mass of Specific fluororesin 1 (% by mass) | | 8.57 | 16.67 | 1.43 | 0.95 | 0.48 |
| Initial physical properties | Visible light reflectance (%) | 59.8 | 59.2 | 60.7 | 61.0 | 61.5 |
| | Blocking test passing temperature (° C.) | 60 | 60 | 70 | 70 | 70 |
| | Cross-cut CELLOTAPE peeling test | A | B | A | A | A |
| After weather resistance test | Cross-cut CELLOTAPE peeling test after back exposure | A | C | A | A | A |
| | Cross-cut CELLOTAPE peeling test after top exposure | A | C | A | A | A |

TABLE 2

| | | Example 12 | Example 13 | Example 14 | Example 15 | Example 16 | Example 17 | Example 18 |
|---|---|---|---|---|---|---|---|---|
| Compositions of coating materials (parts by mass) | Titanium oxide | 25 | 25 | 25 | 0 | 0 | 0 | 0 |
| | Aluminum cobalt oxide | 0 | 0 | 0 | 25 | 25 | 0 | 0 |
| | Copper cyanine green | 0 | 0 | 0 | 0 | 0 | 15 | 15 |
| | Solution of specific fluororesin 1 | 65 | 65 | 65 | 65 | 65 | 65 | 65 |
| | Solvent (MEK/toluene = 50/50) | 43 | 43 | 43 | 43 | 43 | 35 | 35 |
| | Solution of esterified cellulose resin 1 | 0 | 3.3 | 0.5 | 3 | 3 | 5 | 3 |
| | Curing agent | 0 | 0 | 1 | 0 | 2 | 0 | 1 |
| Contents in coating materials excluding solvent (% by mass) | Titanium oxide | 39.1 | 38.7 | 38.4 | 0.0 | 0.0 | 0.0 | 0.0 |
| | Aluminum cobalt oxide | 0.0 | 0.0 | 0.0 | 38.7 | 37.5 | 0.0 | 0.0 |
| | Copper cyanine green | 0.0 | 0.0 | 0.0 | 0.0 | 0.0 | 27.3 | 27.0 |
| | Specific fluororesin 1 | 60.9 | 60.3 | 59.9 | 60.4 | 58.6 | 70.9 | 70.1 |
| | Esterified cellulose resin 1 | 0.0 | 1.0 | 0.2 | 0.9 | 0.9 | 1.8 | 1.1 |
| | Curing agent | 0.0 | 0.0 | 1.5 | 0.0 | 3.0 | 0.0 | 1.8 |
| Molar ratio of isocyanate groups in curing agent to hydroxy groups in specific fluororesin 1 [NCO]/[OH] | | 0.0 | 0.0 | 0.11 | 0.0 | 0.23 | 0.0 | 0.11 |
| Amounts of CAB with respect to 100 parts by mass of Specific fluororesin 1 (% by mass) | | 0.00 | 1.69 | 0.26 | 1.54 | 1.54 | 2.56 | 1.54 |
| Initial physical properties | Visible light transmittance (%) | 48.9 | 50.1 | 50.1 | 53.5 | 52.1 | 45.1 | 44.8 |
| | Blocking test passing temperature (° C.) | 30 | 45 | 50 | 45 | 55 | 50 | 55 |
| | Cross-cut CELLOTAPE peeling | A | A | A | A | A | A | A |
| After weather resistance test | Cross-cut CELLOTAPE peeling test after back exposure | A | A | A | A | A | A | A |
| | Cross-cut CELLOTAPE peeling test after top exposure | A | A | A | A | A | A | A |

TABLE 3

| | | Example 19 | Example 20 |
|---|---|---|---|
| Compositions of coating materials (parts by mass) | Solution of specific fluororesin 2 | 65 | 65 |
| | Solvent (MEK:toluene = 50:50) | 25 | 25 |
| | Solution of esterified cellulose resin 1 | 3 | 3 |
| | UV absorber | 0 | 4 |
| Contents in coating materials excluding solvent (% by mass) | Specific fluororesin 2 | 98.2 | 87.6 |
| | Esterified cellulose resin 1 | 1.8 | 1.6 |
| | UV absorber | 0.0 | 10.8 |
| Amounts of CAB with respect to 100 parts by mass of specific fluororesin 2 (parts by mass) | | 1.84 | 1.84 |
| Initial physical properties | Visible light transmittance (%) | 90.1 | 89.6 |
| | Blocking test passing temperature (° C.) | 45 | 45 |
| | Cross-cut CELLOTAPE peeling | A | A |
| Surface printing test | Cross-cut CELLOTAPE peeling test after printing UV curable acrylic ink | A | A |
| | Cross-cut CELLOTAPE peeling test after printing coating material of Example 2 | A | A |

Examples 21 to 24

Layered bodies were obtained in the same manner as in Example 1, except that the compositions of the respective coating materials were changed. The mixed solvent of toluene and MEK with a mass ratio of toluene/MEK=50/50 was mixed such that each coating material had a viscosity of from 22 to 26 seconds as measured using a #3 Zahn cup. Each of the dried coating film had a thickness of 2 μm. The compositions of the coating materials, the contents of the components in the coating materials excluding the solvent, and evaluation results are shown in Table 4 and Table 5.

The layered bodies of Examples 21 to 24 had a blocking test passing temperature of 45 °C, and was regarded to have passed the test in the overall evaluation. In addition, evaluation results of the cross-cut CELLOTAPE (registered trademark) peeling tests performed initially and after the weather resistance test were A in all of these examples, indicating that a sufficient cohesion and adhesion to the film were exhibited.

TABLE 4

| | | Example 21 | Example 22 |
|---|---|---|---|
| Compositions of coating materials (parts by mass) | Specific aluminum composite particle paste | 30 | 30 |
| | Solution of specific fluororesin 1 | 70 | 70 |
| | Solvent (MEK:toluene = 50/50) | 25 | 22 |
| | Solution of esterified cellulose resin 2 | 3 | 7 |
| | Curing agent | 0 | 0 |
| Contents in coating materials excluding solvent (% by mass) | Specific aluminum composite particles | 25.8 | 25.5 |
| | Specific fluororesin 1 | 73.1 | 72.1 |
| | Esterified cellulose resin 2 | 1.0 | 2.4 |
| | Curing agent | 0.0 | 0.0 |
| Molar ratio of isocyanate groups in curing agent to hydroxy groups in specific fluororesin 1 [NCO]/[OH] | | 0.0 | 0.0 |
| Amounts of esterified cellulose resin 2 with respect to 100 parts by mass of specific fluororesin 1 (parts by mass) | | 1.43 | 3.33 |
| Initial physical properties | Visible light reflectance (%) | 60.1 | 60.3 |
| | Blocking test passing temperature (° C.) | 45 | 45 |
| | Cross-cut CELLOTAPE peeling test | A | A |
| After weather resistance test | Cross-cut CELLOTAPE peeling test after back exposure | A | A |
| | Cross-cut CELLOTAPE peeling test after top exposure | A | A |

TABLE 5

| | | Example 23 | Example 24 |
|---|---|---|---|
| Compositions of coating materials (parts by mass) | Specific aluminum composite particle paste | 30 | 30 |
| | Solution of specific fluororesin 1 | 70 | 70 |
| | Solvent (MEK:toluene = 50/50) | 25 | 22 |
| | Solution of esterified cellulose resin 3 | 3 | 7 |
| | Curing agent | 0 | 0 |
| Contents in coating materials excluding solvent (% by mass) | Specific aluminum composite particles | 25.8 | 25.5 |
| | Specific fluororesin 1 | 73.1 | 72.1 |
| | Esterified cellulose resin 3 | 1.0 | 2.4 |
| | Curing agent | 0.0 | 0.0 |
| Molar ratio of isocyanate groups in curing agent to hydroxy groups in specific fluororesin 1 [NCO]/[OH] | | 0.0 | 0.0 |
| Amounts of esterified cellulose resin 3 with respect to 100 parts by mass of specific fluororesin 1 (parts by mass) | | 1.43 | 3.33 |
| Initial physical properties | Visible light reflectance (%) | 59.9 | 59.8 |
| | Blocking test passing temperature (° C.) | 45 | 45 |
| | Cross-cut CELLOTAPE peeling test | A | A |
| After weather resistance test | Cross-cut CELLOTAPE peeling test after back exposure | A | A |
| | Cross-cut CELLOTAPE peeling test after top exposure | A | A |

The disclosure of Japanese Patent Application No. 2020-170122 is incorporated herein by reference in its entirety.

All publications, patent applications, and technical standards mentioned in the present specification are incorporated herein by reference to the same extent as if each individual publication, patent application, or technical standard was specifically and individually indicated to be incorporated by reference.

REFERENCE SIGNS LIST

10 layered body
12 substrate
14 coating film
L sunlight

The invention claimed is:

1. A resin composition, comprising:

a copolymer including a fluoroolefin unit and a monomer unit having a hydroxy group; and an esterified cellulose resin, wherein a content of the esterified cellulose resin is from 0.2 to 5.00 parts by mass with respect to 100 parts by mass of the copolymer including a fluoroolefin unit and a monomer unit having a hydroxy group.

2. The resin composition according to claim 1, wherein the esterified cellulose resin has a hydroxy group content of from 0.1 to 10% by mass.

3. The resin composition according to claim 1, wherein the esterified cellulose resin comprises at least one selected from the group consisting of a. cellulose acetate butyrate resin and a cellulose acetate propionate resin.

4. The resin composition according to claim 1, wherein the fluoroolefin comprises at least one selected from the group consisting of vinyl fluoride, vinylidene fluoride, trifluoroethylene, chlorotrifluoroethylene, tetrafluoroethylene, hexafluoropropylene, perfluorobutene-1, perfluorohexene-1, perfluorononene-1, and a (perfluoroalkyl)ethylene.

5. The resin composition according to claim 1, wherein the monomer having a hydroxy group comprises at least one selected from the group consisting of allyl alcohol, a hydroxyalkyl vinyl ether, a hydroxyalkyl allyl ether, a hydroxyalkyl (meth)acrylate, a vinyl hydroxyalkylcarboxylate, and an allyl hydroxyalkylcarboxylate.

6. The resin composition according to claim 1, wherein:

the resin composition does not comprise a curing agent, or the resin composition comprises a curing agent, and a molar ratio of curable groups in the curing agent to hydroxy groups in the copolymer including a fluoroolefin unit and a monomer unit having a hydroxy group, is 0.5 or less.

7. A coating material for application to a substrate comprising a fluororesin, the coating material comprising the resin composition according to claim 1.

8. A layered body, comprising:

a substrate; and a coating film formed from the resin composition according to claim 1.

9. The layered body according to claim 8, wherein the substrate comprises a fluororesin.

10. The layered body according to claim 9, wherein the fluororesin comprises at least one selected from the group consisting of a vinyl fluoride polymer, a vinylidene fluoride polymer, a vinylidene fluoride-hexafluoropropylene copolymer, a tetrafluoroethylene-hexafluoropropylene-vinylidene fluoride copolymer, a tetrafluoroethylene-propylene copolymer, a tetrafluoroethylene-vinylidene fluoride-propylene copolymer, an ethylene-tetrafluoroethylene copolymer, a hexafluoropropylene-tetrafluoroethylene copolymer, an ethylene-hexafluoropropylene-tetrafluoroethylene copolymer, a perfluoro (alkyl vinyl ether)-tetrafluoroethylene copolymer, a chlorotrifluoroethylene polymer, and an ethylene-chlorotrifluoroethylene copolymer.

11. A membrane material for a membrane structure facility, a screen, a signboard, or solar radiation control, comprising the layered body according to claim 8.

12. The resin composition according to claim 1, wherein a hydroxy value of the copolymer is from 10 mg to 50 mg KOH/g.

* * * * *